United States Patent

Meuse et al.

[11] Patent Number: 5,947,590
[45] Date of Patent: Sep. 7, 1999

[54] HIGH POWER ARC LAMP REFLECTOR WITH SHROUD AND PLURALITY OF COOLING FINS ON EXTERIOR SURFACE OF REFLECTOR FOR IMAGE PROJECTOR

[75] Inventors: Michael A. Meuse, Leucadia; David P. Carosella, Jr., San Diego, both of Calif.

[73] Assignee: Hughes-JVC Technology Corporation, Carlsbad, Calif.

[21] Appl. No.: 08/929,897

[22] Filed: Sep. 15, 1997

[51] Int. Cl.[6] ................................................. F21K 27/00
[52] U.S. Cl. .......................... 362/264; 362/345; 362/294; 362/373
[58] Field of Search .................... 362/264, 345, 362/294, 373

[56] References Cited

U.S. PATENT DOCUMENTS

| | | | |
|---|---|---|---|
| 3,598,482 | 8/1971 | Miller | 353/98 |
| 3,936,686 | 2/1976 | Moore | 313/36 |
| 3,961,846 | 6/1976 | Crew | 353/27 R |
| 4,004,426 | 1/1977 | Laing | 60/659 |
| 4,097,919 | 6/1978 | Bobrick et al. | 362/270 |
| 4,219,871 | 8/1980 | Larrimore | 362/264 |
| 4,292,579 | 9/1981 | Constant | 322/2 R |
| 4,296,388 | 10/1981 | Draggoo | 331/94.5 L |
| 4,337,508 | 6/1982 | Moffatt | 362/294 |
| 4,598,347 | 7/1986 | Peppers | 362/373 |
| 4,780,799 | 10/1988 | Groh | 362/294 |
| 4,841,422 | 6/1989 | Groh | 362/294 |
| 4,935,853 | 6/1990 | Collins | 362/272 |
| 5,285,363 | 2/1994 | Meuse | 362/293 |
| 5,458,505 | 10/1995 | Prager | 439/485 |
| 5,510,827 | 4/1996 | Kubota et al. | 347/257 |
| 5,515,255 | 5/1996 | Nielson et al. | 362/297 |
| 5,528,714 | 6/1996 | Kingstone et al. | 385/100 |
| 5,557,451 | 9/1996 | Copenhaver et al. | 359/350 |
| 5,561,338 | 10/1996 | Roberts et al. | 313/46 |
| 5,580,164 | 12/1996 | Maddox et al. | 362/293 |
| 5,613,752 | 3/1997 | Vezard | 362/32 |

OTHER PUBLICATIONS

"Offset Rectangular Plate–Fin Surfaces—Heat Transfer And Flow Friction Characteristics", A. L. London and R. K. Shah; Paper No. 68—GT8; 11 pages.

Primary Examiner—Sandra O'Shea
Assistant Examiner—Ronald E. DelGizzi
Attorney, Agent, or Firm—Harness, Dickey, Pierce, P.L.C.

[57] ABSTRACT

A high power image projector includes a plurality of rows of spaced-apart cooling fins on the exterior surface of its light source reflector. The cooling fins are offset relative to adjacent cooling fins, thus disrupting the thermodynamic boundary layer of cooling air flowing over the reflector surface with a shroud. Thus the high-power projector can be adequately cooled with cooling air or other gases, without the need for a liquid cooling system.

39 Claims, 5 Drawing Sheets

HIGH POWER ARC LAMP REFLECTOR WITH SHROUD AND PLURALITY OF COOLING FINS ON EXTERIOR SURFACE OF REFLECTOR FOR IMAGE PROJECTOR

BACKGROUND AND SUMMARY OF THE INVENTION

This invention relates generally to image light projectors using high power light sources, such as high power arc lamps and more particularly to a cooling arrangement for high power arc lamp reflectors.

Image light projectors, especially those used for projecting a still or moving image onto or through a large screen, typically use high power arc lamps, that operate at 5000 to 7000 watts and higher. Such projectors are usually equipped with reflectors that generally surround the light sources in order to concentrate the desired components of the beam of light and render the image large enough and bright enough to be viewed by large numbers of viewers, for example. Because of the high power necessary to accomplish this projection task, the surface temperature of these high power lamp reflectors can reach levels that would damage the reflective coatings on the inside surface of the reflectors if adequate cooling of the reflector were not provided. Currently, in these large projectors, such cooling is typically accomplished by cooling apparatuses that convey water or other liquid coolant along the exterior surface of the reflector, between such exterior surface and a spaced-apart surrounding shroud.

Such liquid cooling systems thus require an external heat sink, generally in the form of an external heat exchanger, to cool the water or other liquid coolant, which is then recirculated back over the exterior surface of the reflector. This results in increased complexity and cost of such projector systems, both in terms of their initial purchase prices and the costs of maintenance of the projection equipment. Furthermore, these systems present the potential danger associated with water or other liquid coolant leaks in and around the various electrical components of the projector.

Previously, such liquid cooling systems have been necessary since air cooling systems had not proven to be adequate for such high power lamp devices unless other cooling systems, cooling apparatuses or features are used in conjunction with the air cooling scheme.

According to the present invention, however, a single air cooling system is provided that overcomes these disadvantages and provides adequate cooling for such high power lamp applications at a reasonable cost without the necessity of complex, high-maintenance external equipment. In a high power lamp device equipped with a cooling arrangement according to the present invention, a reflector generally surrounds the high-temperature light source with a shroud generally surrounding at least a portion of the reflector and spaced apart from its external surface. Typically, reflectors and shrouds of this type are of a generally bell-shaped configuration, having an apex end, at which the light source is located, and an open mouth end, with at least the reflector being defined by a curved surface of revolution circumferentially about a central axis passing through the apex. Such curved surface of revolution for the reflector can be generally elliptical, generally circular, or have yet other shapes adapted to meet the projection and light transmission requirements of the device.

A plurality of cooling fins are disposed along the exterior surface of the reflector and protrude generally radially outwardly therefrom in a direction toward the interior of the shroud. Such cooling fins are arranged in a plurality of spaced-part rows, with the rows extending along at least a portion of the exterior surface of the reflector from a location generally adjacent the apex of the reflector toward the mouth of the reflector. The cooling fins are spaced apart from one another within each of the rows, and the spaced-apart cooling fins in each row are offset in the axial direction relative to the spaced-apart cooling fins in at least one circumferentially-adjacent row of cooling fins.

Preferably, the circumferential distance between adjacent rows of cooling fins increases in a direction from the apex of the reflector toward the mouth of the reflector, with the cooling fins thus also preferably being offset in the circumferential direction with respect to their axially adjacent cooling fins in each row of cooling fins.

In order to provide this configuration of cooling fins and rows, the cooling fins are preferably arranged in pairs of circumferentially adjacent rows with the adjacent pairs being interconnected by a base plate. The base plate is affixed to the exterior surface of the reflector and curves outwardly from a location generally adjacent the apex of the reflector toward the mouth of the reflector, thus conforming closely to the exterior surface shape of the reflector. In a preferred form of the invention shown for purposes of illustration herein the cooling fins are all of the same radially outwardly protruding length. However, it should be noted that the present invention also encompasses cooling fins of varying lengths around the circumference of the reflector or along its axial length, if deemed necessary or suitable in a given application.

One of the advantages of the present invention, in addition to those mentioned above, is that the cooling effectiveness of the cooling systems of the present invention allows for the use of a wider variety of reflective surface coatings on the inside of the reflector, thus making the projection device more efficient and effective in projecting beams of light having the desired characteristics for a given application.

Additional objects, advantages, and features of the present invention will become apparent from the following description and the appended claims, taken in conjunction with the accompanying drawings.

DETAILED DESCRIPTION OF THE PREFERRED EMBODIMENTS

FIGS. 1 through 12 depict a preferred embodiment of the present invention, along with showing examples of its intended environment, for purposes of illustration. One skilled in the art will readily recognize from the following discussion, taken in conjunction with the accompanying drawings, that the illustrative embodiment depicted in the drawings is merely exemplary, and further that one skilled in the art will readily recognize that various modifications can be made without departing from the spirit, scope and principles of the invention.

Figure 1:
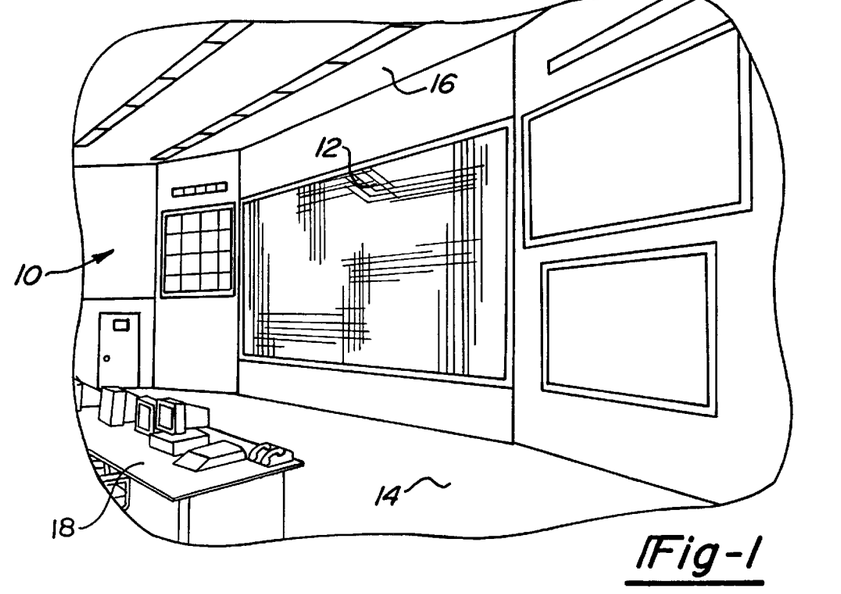
FIG. 1 illustrates a typical application of a high power arc lamp projector according to the present invention, wherein the projector is used to display images or data on a large screen that can be viewed by large numbers of viewers in an expansive space.

In FIG. 1 an exemplary control room 10 is illustrated, having a very large projection screen 12 extending nearly from the floor 14 to the ceiling 16 of the control room 10. Such a large projection screen 12 is suitable for viewing from any of a number of control stations 18, for example, at which operators can perform their job tasks and easily and conveniently view the results of their work on the projection screen 12. Such control room 10 is only one of a wide variety of indoor or outdoor applications of projection devices having the present invention, including traffic control facilities, guided missile control facilities, security monitoring centers, or a vast variety of entertainment facilities, for example.

Figure 2:
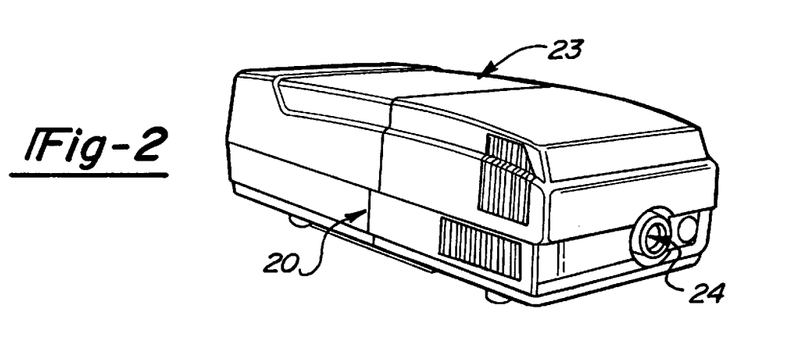
FIG. 2 generally illustrates a high power arc lamp projector having a single lens, in which the present invention can be advantageously employed.
Figure 3:
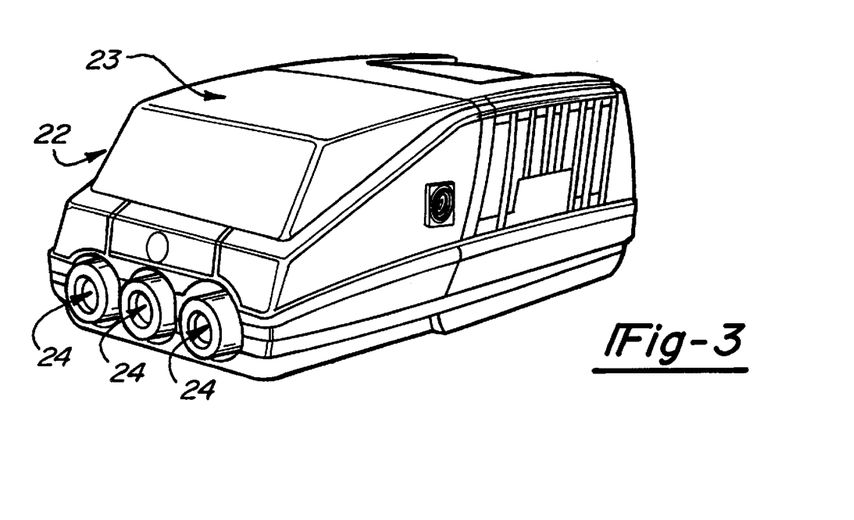
FIG. 3 is a view similar to that of FIG. 2, but illustrating a three-lens high power arc lamp projector employing a cooling system according to the present invention.

FIGS. 2 and 3 depict an exemplary single-lens projector 20 and an exemplary multiple-lens projector 22, respectively. Each of the projectors 20 and 22 generally includes a housing structure 23 and one or more projection lamp and lens assemblies 24.

FIGS. 4 through 12 illustrate a light reflector 30, generally surrounding a lamp, bulb or other light source (not shown) located within the reflector 30, generally adjacent an apex 32 of the reflector 30. The light source directs a beam of light outwardly through the open end or mouth 34 of the reflector 30, with the reflector 30 being adapted for use in high power arc lamp projectors or other high power lamp devices, such as those shown for purposes of illustration in FIGS. 2 and 3.

Figure 4:
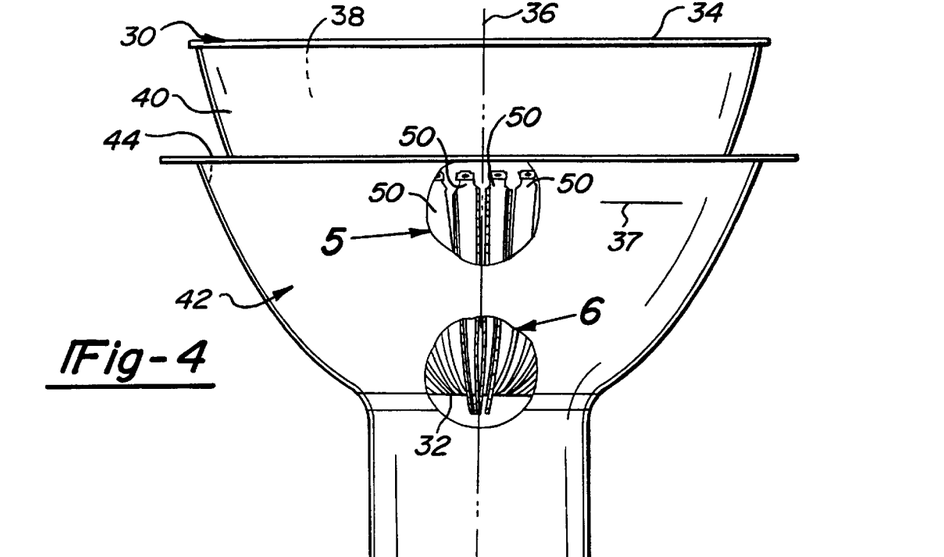
FIG. 4 is a side view of the lamp and reflector assembly, with portions of the surrounding shroud being broken away to illustrate the cooling fins on the exterior of the reflector.

The reflector 30 includes an interior surface 38 and an exterior surface 40, with the shape of the reflector 30 preferably being defined by a curved surface of revolution in a circumferential direction indicated by arrow 37 about a central axis 36. The reflector 30 is preferably at least partially surrounded by a generally similarly-shaped shroud 42, with the interior surface 44 of the shroud 42 surrounding the exterior surface 40 of the reflector 30 along at least a portion of its axial length and spaced radially outwardly from its exterior surface 40.

Figure 12:
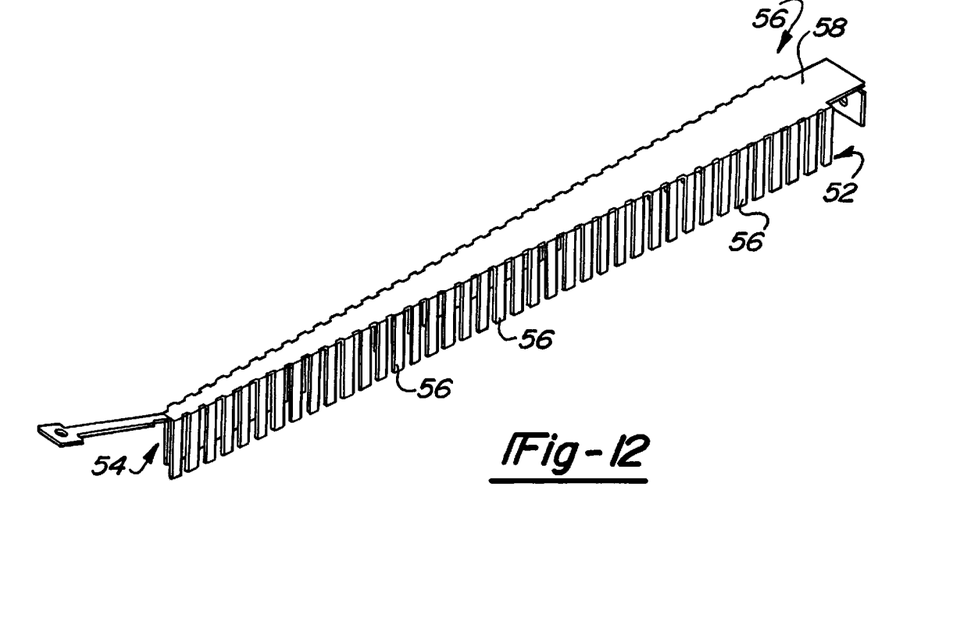
FIG. 12 is a perspective view of one of the plurality of two-row cooling fin structures, prior to installation on the exterior of the reflector, illustrating a base plate interconnecting two adjacent rows of cooling fins.

The exterior surface 40 of the reflector 30 preferably has a plurality of cooling fin assemblies 50 thereon, each of which includes a cooling fin row 52 and a cooling fin row 54. Each of the rows 52 and 54 includes a plurality of spaced-apart cooling fins 56 interconnected by a base plate 58. As mentioned above, the base plate 58 preferably curves generally outwardly from the apex 32 along at least a portion of the exterior surface 40 toward the mouth 34 of the reflector 30. Such base plates 58 are affixed to the exterior surface 40 of the reflector 30 using any of a number of known affixation methods that will promote the transfer of heat from the reflector 30 into the base plate 58 and thus the cooling fins 56. The base plate 58 conforms closely to the external shape of the reflector 30 in order to avoid heat-blocking gaps therebetween.

An air conveying means (not shown) is provided to convey a flow of cooling air along the exterior surface 40 of the reflector 30, within the interior of the shroud 42. During its flow along the exterior surface 40 of the reflector 30, the cooling air creates a thermodynamic boundary layer along the exterior surface 40 of the reflector 30. The arrangement of the cooling fin assemblies 50 and the cooling fins 56 in the rows 52 and 54, as described below, serves to disrupt this thermodynamic boundary layer, and also to increase the air turbulence, in order to greatly enhance the convective heat transfer of heat from the light source, through the reflector 30 and into the cooling air, which is then exhausted.

Figure 5:
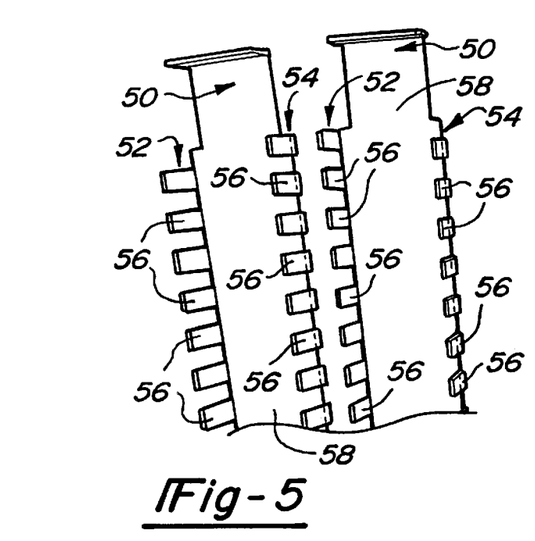
FIG. 5 is a detailed view of the cooling fins on the exterior of the reflector, generally toward the mouth of the reflector, as seen through the broken-away portion 5 of FIG. 4.
Figure 6:
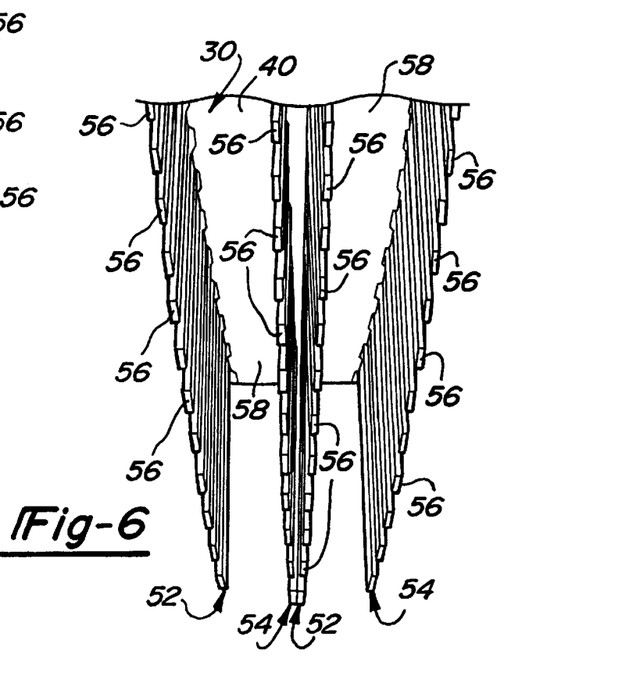
FIG. 6 is a detailed view of the cooling fins on the exterior surface of the reflector, generally adjacent the apex of the reflector, as seen through the broken away portion 6 of FIG. 4.
Figures 7, 8, 9:
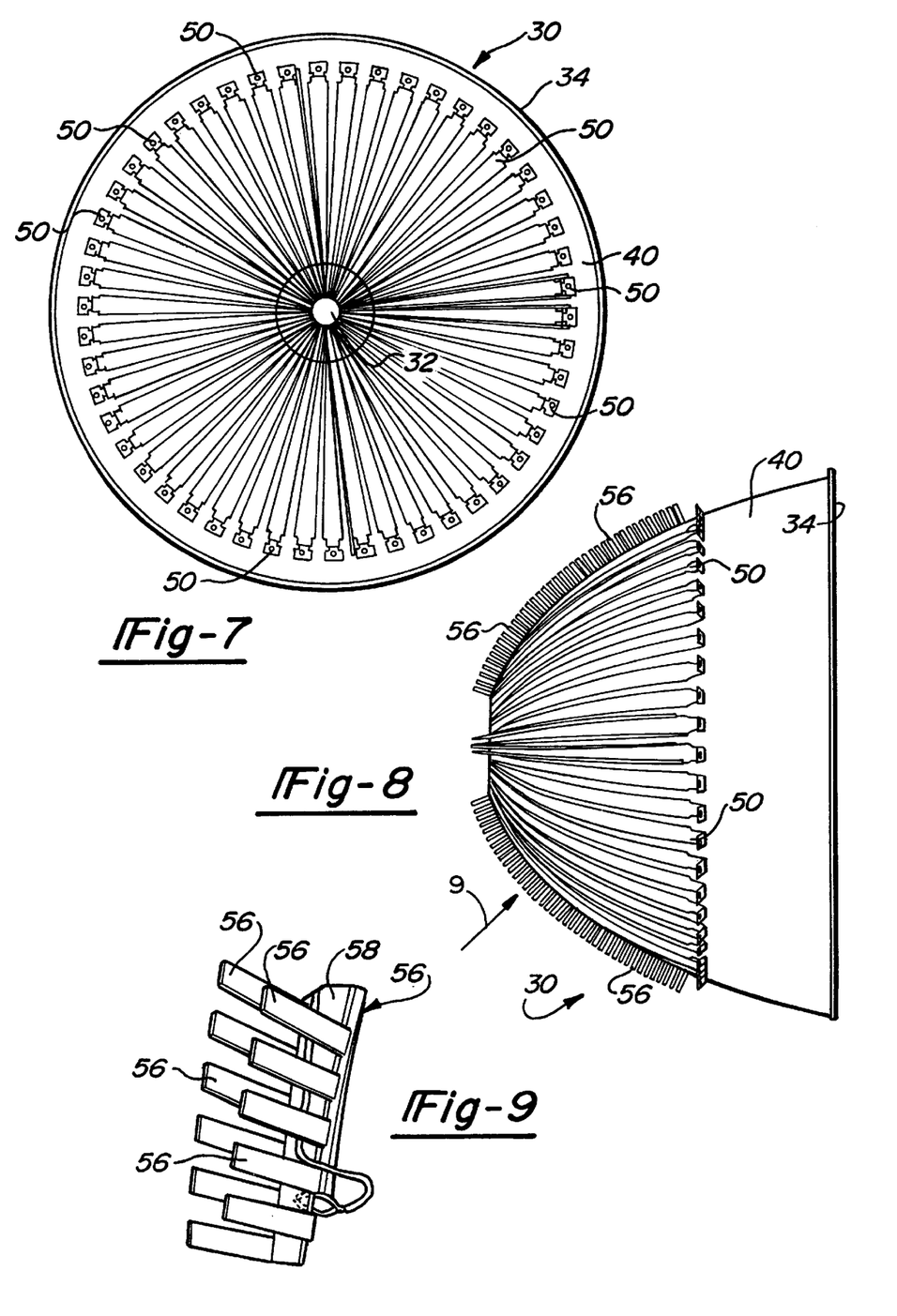
FIG. 7 is a bottom view of the reflector of FIG. 4, with the shroud removed for clarity.
FIG. 8 is a side view of the reflector shown in FIG. 7.
FIG. 9 is a detailed view of the offset nature of the cooling fins in adjacent rows, looking generally in the direction indicated by the arrow 9 of FIG. 8.
Figure 10:
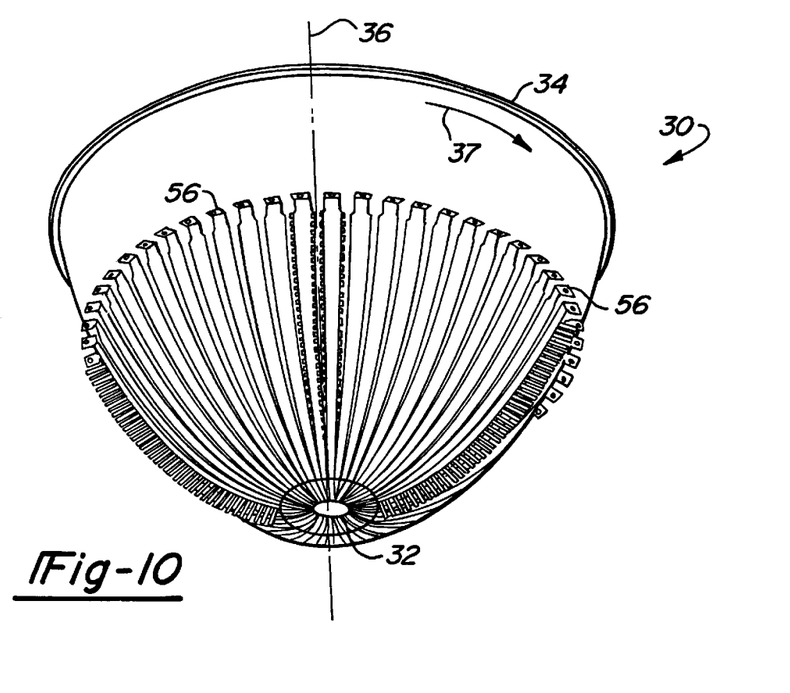
FIG. 10 is a bottom perspective view of the reflector of FIGS. 4 through 9, further illustrating the array of cooling fins on the exterior surface thereof.
Figure 11:
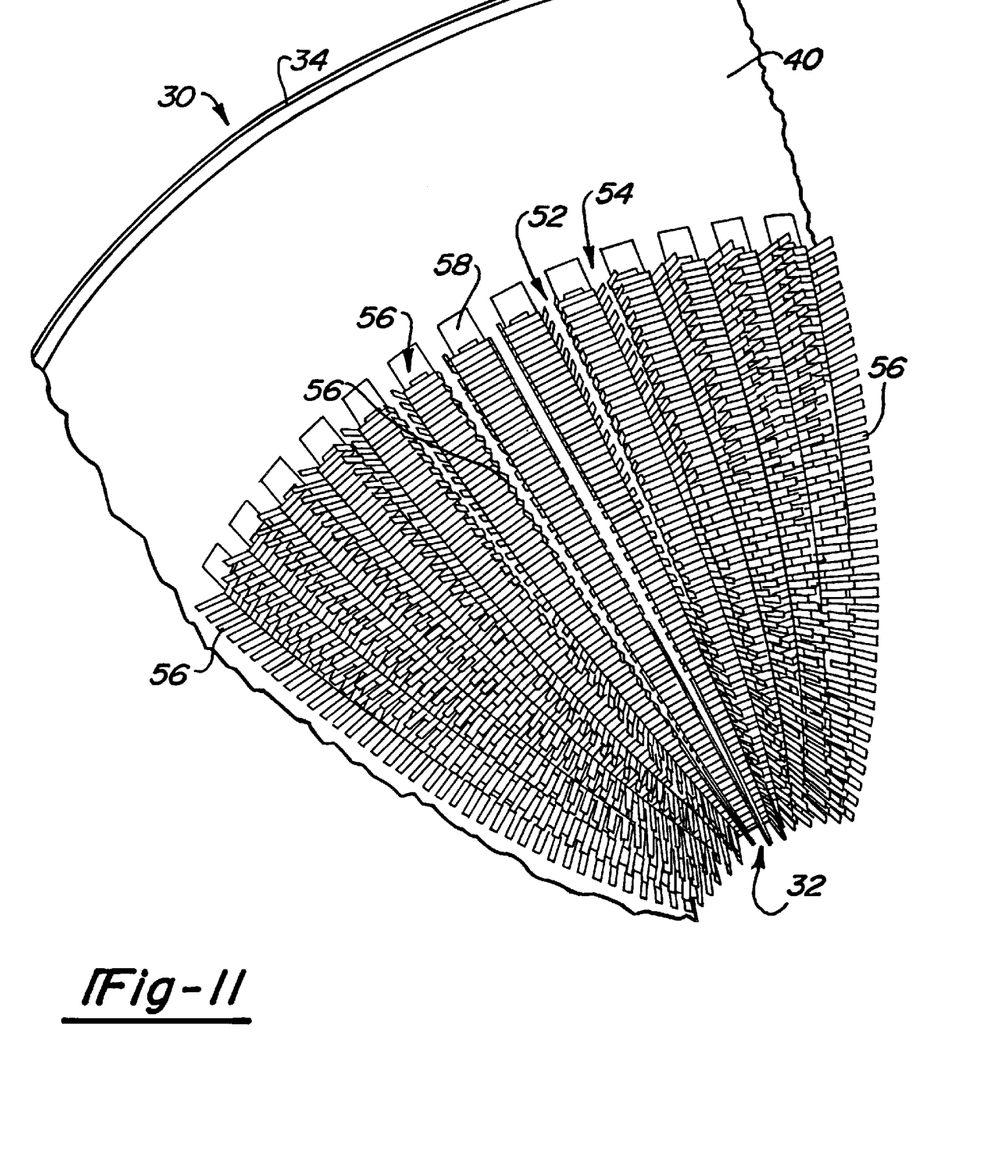
FIG. 11 is an enlarged, partial perspective view of a portion of the exterior surface of the reflector shown in FIGS. 4 through 10, with the cooling fins disposed on a portion of the external surface thereof.

As can perhaps best be seen from the detailed views depicted in FIGS. 5, 6 and 9, the cooling fins 56 that are spaced axially apart from one another along the cooling fin row 52 of the cooling fin assembly 50 are offset (in the axial direction) relative to the spaced-apart cooling fins 56 in the cooling fin row 54 of the cooling assembly 50. This offset relationship between the cooling fins 56 in adjacent rows 52 and 54 greatly contributes to the effective breakup of the thermodynamic boundary layer created by the flow of cooling air between the shroud 42 and the reflector 30, thus greatly enhancing the cooling heat transfer from the reflector 30.

In addition, the circumferential distance between adjacent cooling fins rows 52 and 54 preferably increases along the base plate 58 from a position generally adjacent the apex 32 of the reflector 30 toward the mouth 34 of the reflector 30. Because of this preferred increasing space between the cooling fin rows 52 and 54, the cooling fins 56 in each of these rows (52 or 54) are also offset with respect to their adjacent cooling fins 56 (in the circumferential direction).

In a preferred form of the invention illustrated in the drawings, the cooling fins 56 are all of equal length, protruding outwardly an equal radial distance from the exterior surface 40 of the reflector 30. One skilled in the art will readily recognize, however, that such equal length relationship among the cooling fins 56 can be modified in order to vary the length of the cooling fins (axially or circumferentially) as deemed necessary or suitable in a particular reflector cooling application.

Preferably, as illustrated in FIG. 12, the cooling fin assemblies 50 are formed by being stamped from flat plate material, such as copper, aluminum, or other thermally highly conductive materials. The fins 56 are then bent outwardly into their radially outwardly-protruding disposition with respect to the base plate 58. The base plate 58 is then formed into its outwardly curving configuration closely conforming to the shape of the exterior surface 40 of the reflector 30, as shown in FIGS. 4 through 11. Finally, each of the cooling fin assemblies 50 is affixed to the exterior surface 40 of the reflector 30 by means of brazing, "pasting", soldering, welding, or other high heat-conductive attachment methods.

With adequate cooling of the surface temperature of the reflector 30 of a high power arc lamp device, damage to the reflective coatings typically applied to the interior surface 38 of the reflector 30 can be avoided. In turn, this allows for greater flexibility in the use of reflective coatings having the reflective characteristics desired in a given application. Furthermore, the offset arrangement of the cooling fins 56 enhances the air cooling to the point that the surface temperature of the high heat flux reflector 30 is cooled to a temperature below the previously-designed temperature without excessive air flow requirements. In this regard, the number of cooling fin assemblies 50, the number of cooling fins 56 in each of the cooling fin rows 52 and 54, as well as the width and radial length of the cooling fins 56 can now be readily determined in a given application in order to enhance the air cooling to maintain the reflector below the necessary design temperature. By doing so, the amount of disruption of the thermodynamic boundary layer of the cooling air and the amount of augmentation of the surface area available for heat transfer, as provided by the cooling fin assembly structure of the present invention, can readily be determined for a given application.

In arriving at the present invention, the required geometric relationship among the cooling fins 56 was determined by recognizing that the highest heat flux is at the base or apex of the reflector. Thus, the cooling fin spacing and size were determined according to established and known heat transfer principles to meet the heat removal requirements at the base or apex location.

In one experimental construction of the invention, the cooling fin spacing in the first rows of fins was set at 0.44 inches at the mid-height of the fins. This resulted in twenty-five axial rows of fins at any given circumferential location on the reflector. Because the diameter of the reflector increases with the distance from the apex, the fins were set 1.7 inches apart at the open mouth end.

The height or protrusion of the cooling fins (in a radial direction) with respect to the reflector's exterior surface was chosen to be 0.7 inches. Since this radial height set the width of the air flow annulus between the reflector and the shroud, this height was chosen so as to prevent excessive air flow resistance while still providing adequate heat transfer area.

In order to achieve the desired disruption of the thermodynamic boundary layer of the cooling air flowing over the exterior surface of the reflector, the amount of offset of the circumferentially adjacent cooling fins was determined by locating one row of cooling fins in line with a location mid-way between the fins in the circumferentially adjacent row, with the fins in a given row starting at a location in line with the end of the previous row. This resulted in rows of fins that were offset by one-half of a fin pitch from the first row of fins.

To achieve this fin configuration on the surface of the reflector, two different configurations of the fin assemblies were designed. In one of the arrangements, an odd number of fins was provided on the "left-hand" side of the cooling fin assembly, such as illustrated in the drawings by cooling fin row 52, and an even number of cooling fins were provided in the adjacent, "right-hand" row (54). Furthermore, in the adjacent cooling fin assembly, an opposite arrangement was used, with the odd number of cooling fins being on the "right-hand" side, and an even number of cooling fins being provided on the "left-hand" side.

Preferably, the cooling fin assemblies 50 are constructed of copper or other high thermal conductivity materials. In order for the surface area and heat transfer augmentation to be effective, good thermal contact between the cooling fin assemblies 50 and the reflector exterior surface 40 were achieved by brazing, or by the use of thermal pastes, with brazing being the preferred method of attachment of the fin assemblies to the reflector.

In order to maintain the cooling air adjacent to the exterior surface 40 of the reflector 30, the shroud 40 was provided along at least a portion of the axial length of the exterior surface 40 of the reflector 30. This created the above-discussed air flow annulus around the reflector, with the cooling air preferably entering at the bottom or apex end of the annulus via a 6 inch diameter supply duct (in the experimental construction) and flowing outwardly across the fins to the shroud outlet end or mouth.

In the experimental configuration discussed above, the maximum measured reflector temperature was 368.6 F. without the cooling fins in place. However, when the cooling fins were installed as described above, the maximum measured reflector temperature was only 172.4. These measurements were made at a location about 1 inch from the apex of the reflector. Further test data for these measurements are set forth below.

| TEST DATA | | |
|---|---|---|
| | NO FINS | WITH FINS |
| AIR VELOCITY AT FOUR LOCATIONS AROUND THE SHROUD @ THE AIR OUTLET: Feet Per Minutes (FPM) | | |
| Location 1 | 2108 FPM | 1300 FPM |
| Location 2 | 1400 FPM | 1220 FPM |
| Location 3 | 850 FPM | 1000 FPM |
| Location 4 | 2000 FPM | 1990 FPM |
| AIR TEMPERATURE AT FOUR LOCATIONS AROUND THE SHROUD @ THE AIR OUTLET: | | |
| Location 1 | 98.5 F | 107 F |
| Location 2 | 99.7 F | 110.9 F |
| Location 3 | 101 F | 107.8 F |
| Location 4 | 91.9 F | 110 F |
| MEASURED REFLECTOR TEMP. °F. | 368 F | 171.6 F |
| AMBIENT TEMPERATURE AT FAN INLETS °F. | | |
| 1 | 81.5 F | 80.5 F |
| 2 | 80.0 F | 85.6 F |
| INPUT LAMP POWER | 6820 WATTS | 6778 WATTS |

The foregoing discussion discloses and describes merely exemplary embodiments of the present invention for purposes of illustration only. One skilled in the art will readily recognize from the such discussion, and from the accompanying drawings and claims, that various changes, modifications and variations can be made therein without departing from the spirit and scope and principles of the invention as defined in the following claims.

We claim:

1. In a high power lamp device having a high power light source, a reflector generally surrounding the light source and having an interior surface and an exterior surface, and a shroud having an interior surface generally surrounding at least a portion of the reflector and spaced therefrom, the reflector being of a shape having an apex and a mouth and being defined by a curved surface of revolution extending circumferentially about a central axis passing through the apex, the light source being located within the interior of the reflector and generally at the apex of the reflector therein, the improvement comprising a plurality of cooling fins disposed on the exterior surface of the reflector and protruding radially outwardly therefrom in a direction generally toward the interior of the shroud, said cooling fins being arranged in a plurality of spaced-apart rows, said rows extending from a location generally adjacent the apex of the reflector toward the mouth of the reflector along at least a portion of the exterior surface of the reflector, said cooling fins being spaced apart from one another within each of said rows, the spaced-apart cooling fins in each of said rows being offset in the axial direction relative to the spaced-apart cooling fins in at least one circumferentially adjacent row.

2. The improvement according to claim 1, wherein at least some of said cooling fins are also offset in the circumferential direction with respect to at least one axially adjacent cooling fin in each of said rows.

3. The improvement according to claim 1, wherein the curved surface of revolution is generally elliptical with respect to the axis thereof.

4. The improvement according to claim 1, wherein the curved surface of revolution is generally circular with respect to the axis thereof.

5. The improvement according to claim 1, wherein the circumferential distance between said adjacent rows of said cooling fins increases in a direction from the apex of the reflector toward the mouth thereof.

6. The improvement according to claim 1, wherein said rows of said offset cooling fins are arranged in pairs of circumferentially adjacent rows thereof, said offset cooling fins in said pairs of circumferentially adjacent rows being interconnected by a base plate, said base plate being curved outwardly generally in the axial direction from a position adjacent the apex of the reflector toward the mouth thereof and generally conforming to the exterior surface thereof.

7. The improvement according to claim 1, wherein all of said cooling fins protrude radially outwardly substantially the same distance from the exterior of the reflector.

8. The improvement according to claim 1, further including means for conveying cooling gaseous fluid along the exterior surface of the reflector between the reflector and the shroud, the flow of said cooling gaseous fluid creating a thermodynamic boundary layer along the exterior surface of the reflector, said offset cooling fins disrupting said thermodynamic boundary layer along the exterior surface of the reflector and thereby substantially enhancing the convective transfer of heat from the reflector of the cooling gaseous fluid.

9. The improvement according to claim 8, wherein said cooling gaseous fluid is air.

10. The improvement according to claim 1, wherein said reflector includes a coating of reflective material on the interior surface thereof.

11. The improvement according to claim 1, wherein the high power lamp is a high power arc lamp.

12. The improvement according to claim 11, wherein said high power arc lamp operates at a power level of at least approximately 5000 watts.

13. The improvement according to claim 1, wherein the high power lamp is the source of illumination for a projector adapted to project a visible image onto an external surface.

14. In a high power lamp device having a high power light source, a reflector generally surrounding the light source and having an interior surface and an exterior surface, and a shroud having an interior surface generally surrounding at least a portion of the reflector and spaced therefrom, the reflector being of a shape having an apex and a mouth and being defined by a curved surface of revolution extending circumferentially about a central axis passing through the apex, the light source being located within the interior of the reflector and generally at the apex of the reflector therein, the improvement comprising a plurality of cooling fins disposed on the exterior surface of the reflector and protruding radially outwardly therefrom in a direction generally toward the interior of the shroud, said cooling fins being arranged in a plurality of spaced-apart rows, said rows extending from a location generally adjacent the apex of the reflector toward the mouth of the reflector along at least a portion of the exterior surface of the reflector, said cooling fins being spaced apart from one another within each of said rows, the spaced-apart cooling fins in each of said rows being offset in the axial direction relative to the spaced-apart cooling fins in at least one circumferentially adjacent row, at least some of said cooling fins are also offset in the circumferential direction with respect to at least one axially adjacent cooling fin in each of said rows, the circumferential distance between said adjacent rows of said cooling fins increasing in a direction from the apex of the reflector toward the mouth thereof, said lamp device further including means for conveying cooling gaseous fluid along the exterior surface of the reflector between the reflector and the shroud, the flow of said cooling gaseous fluid creating a thermodynamic boundary layer along the exterior surface of the reflector, said offset cooling fins disrupting said thermodynamic boundary layer along the exterior surface of the reflector and thereby substantially enhancing the convective transfer of heat from the reflector to the cooling gaseous fluid.

15. The improvement according to claim 14, wherein the curved surface of revolution is generally elliptical with respect to the axis thereof.

16. The improvement according to claim 14, wherein the curved surface of revolution is generally circular with respect to the axis thereof.

17. The improvement according to claim 14, wherein said rows of said offset cooling fins are arranged in pairs of circumferentially adjacent rows thereof, said offset cooling fins in said pairs of circumferentially adjacent rows being interconnected by a base plate, said base plate being curved outwardly generally in the axial direction from a position adjacent the apex of the reflector toward the mouth thereof and generally conforming to the exterior surface thereof.

18. The improvement according to claim 14, wherein all of said cooling fins protrude radially outwardly substantially the same distance from the exterior of the reflector.

19. The improvement according to claim 14, wherein said cooling gaseous fluid is air.

20. The improvement according to claim 14, wherein said reflector includes a coating of reflective material on the interior surface thereof.

21. The improvement according to claim 14, wherein the high power lamp is a high power arc lamp.

22. The improvement according to claim 21, wherein said high power arc lamp operates at a power level of at least approximately 5000 watts.

23. The improvement according to claim 14, wherein the high power lamp is the source of illumination for a projector adapted to project a visible image onto an external surface.

24. In a high power arc lamp having a high power light source, a reflector generally surrounding the light source and having an interior surface and an exterior surface, and a shroud having an interior surface generally surrounding at least a portion of the reflector and spaced therefrom, the reflector being of a shape having an apex and a mouth and being defined by a curved surface of revolution extending circumferentially about a central axis passing through the apex, the light source being located within the interior of the reflector and generally at the apex of the reflector therein, the improvement comprising a plurality of cooling fins disposed on the exterior surface of the reflector and protruding radially outwardly therefrom in a direction generally toward the interior of the shroud, said cooling fins being arranged in a plurality of spaced-apart rows, said rows extending from a location generally adjacent the apex of the reflector toward the mouth of the reflector along at least a portion of the exterior surface of the reflector, said cooling fins being spaced apart from one another within each of said rows, the spaced-apart cooling fins in each of said rows being offset in the axial direction relative to the spaced-apart cooling fins in at least one circumferentially adjacent row, wherein cooling fins are also offset in the circumferential direction with respect to at least one axially adjacent cooling fin in each of said rows, the circumferential distance between said adjacent rows of said cooling fins increasing in a direction from the apex of the reflector toward the mouth thereof, said rows of said offset cooling fins being arranged in pairs of circumferentially adjacent rows thereof, said offset cooling fins in said pairs of circumferentially adjacent rows being interconnected by a base plate, said base plate being curved outwardly generally in the axial direction from a position adjacent the apex of the reflector toward the mouth thereof and generally conforming to the exterior surface thereof, said lamp device further including means for conveying cooling gaseous fluid along the exterior surface of the reflector between the reflector and the shroud, the flow of said cooling gaseous fluid creating a thermodynamic boundary layer along the exterior surface of the reflector, said offset cooling fins disrupting said thermodynamic boundary layer along the exterior surface of the reflector and thereby substantially enhancing the convective transfer of heat from the reflector to the cooling gaseous fluid.

25. The improvement according to claim 24, wherein the curved surface of revolution is generally elliptical with respect to the axis thereof.

26. The improvement according to claim 24, wherein the curved surface of revolution is generally circular with respect to the axis thereof.

27. The improvement according to claim 24, wherein all of said cooling fins protrude radially outwardly substantially the same distance from the exterior of the reflector.

28. The improvement according to claim 24, wherein said cooling gaseous fluid is air.

29. The improvement according to claim 24, wherein said reflector includes a coating of reflective material on the interior surface thereof.

30. The improvement according to claim 24, wherein the high power lamp is a high power arc lamp.

31. The improvement according to claim 30, wherein said high power arc lamp operates at a power level of at least approximately 5000 watts.

32. The improvement according to claim 24, wherein the high power lamp is the source of illumination for a projector adapted to project a visible image onto an external surface.

33. In a high power lamp device having a high power light source, a reflector generally surrounding the light source and having an interior surface and an exterior surface, and a shroud having an interior surface generally surrounding at least a portion of the reflector and spaced therefrom, the reflector being of a shape having an apex and a mouth and being defined by a curved surface of revolution extending circumferentially about a central axis passing through the apex, the light source being located within the interior of the reflector and generally at the apex of the reflector therein, the improvement comprising a plurality of cooling fins disposed on the exterior surface of the reflector and protruding radially outwardly therefrom in a direction generally toward the interior of the shroud, said cooling fins being arranged in a plurality of spaced-apart rows, said rows extending from a location generally adjacent the apex of the reflector toward the mouth of the reflector along at least a portion of the exterior surface of the reflector, said cooling fins being spaced apart from one another within each of said rows, the spaced-apart cooling fins in each of said rows being offset in the axial direction relative to the spaced-apart cooling fins in at least one circumferentially adjacent row, at least some of said cooling fins are also offset in the circumferential direction with respect to at least one axially adjacent cooling fin in each of said rows, the circumferential distance between said adjacent rows of said cooling fins increasing in a direction from the apex of the reflector toward the mouth thereof, said rows of said offset cooling fins are arranged in pairs of circumferentially adjacent rows thereof, said offset cooling fins in said pairs of circumferentially adjacent rows being interconnected by a base plate, said base plate being curved outwardly generally in the axial direction from a position adjacent the apex of the reflector toward the mouth thereof and generally conforming to the exterior surface thereof, said lamp device further including means for conveying cooling air along the exterior surface of the reflector between the reflector and the shroud, the flow of said cooling air creating a thermodynamic boundary layer along the exterior surface of the reflector, said offset cooling fins disrupting said thermodynamic boundary layer along the exterior surface of the reflector and thereby substantially enhancing the convective transfer of heat from the reflector to the cooling air.

34. The improvement according to claim 33, wherein the curved surface of revolution is generally elliptical with respect to the axis thereof.

35. The improvement according to claim 33, wherein the curved surface of revolution is generally circular with respect to the axis thereof.

36. The improvement according to claim 33, wherein said reflector includes a coating of reflective material on the interior surface thereof.

37. The improvement according to claim 33, wherein said high power arc lamp operates at a power level of at least approximately 5000 watts.

38. The improvement according to claim 33, wherein the high power lamp is the source of illumination for a projector adapted to project a visible image onto an external surface.

39. The improvement according to claim 33, wherein all of said cooling fins protrude radially outwardly substantially the same distance from the exterior of the reflector.

\* \* \* \* \*